United States Patent [19]

Pratt

[11] 4,137,852

[45] Feb. 6, 1979

[54] FORWARDLY FOLDABLE TOOLBAR

[75] Inventor: Ronald L. Pratt, Moline, Ill.

[73] Assignee: Deere & Company, Moline, Ill.

[21] Appl. No.: 720,270

[22] Filed: Sep. 3, 1976

[51] Int. Cl.² .................... A01B 65/02; B62D 21/14
[52] U.S. Cl. ....................................... 111/57; 172/311;
172/456; 172/481; 172/581; 172/605; 172/626;
280/411 A; 280/476 A; 280/482; 280/656
[58] Field of Search ................ 111/57, 58; 172/311,
172/310, 324, 456, 457, 458, 481, 568, 581, 582,
605, 626, 312, 313, 477, 240, 242, 244; 280/42,
482, 476 R, 476 A, 411 R, 411 A, 411 C, 412,
656, 413

[56] References Cited

U.S. PATENT DOCUMENTS

| 1,939,460 | 12/1933 | Nelson | 172/581 X |
|---|---|---|---|
| 2,113,832 | 4/1938 | Everett | 172/581 |
| 2,226,586 | 12/1940 | Seaholm | 172/581 X |
| 2,345,803 | 4/1944 | Gemberling | 172/568 |
| 2,559,002 | 7/1951 | Brock | 172/605 |
| 2,667,366 | 1/1954 | Otjen | 280/482 |
| 2,966,219 | 12/1960 | French | 172/311 X |
| 3,072,201 | 1/1963 | Brakhage | 172/458 X |
| 3,162,459 | 12/1964 | Marmorine et al. | 280/656 |
| 3,208,536 | 9/1965 | Orendorff | 172/456 |
| 3,321,028 | 5/1967 | Groenke | 172/456 X |
| 3,333,645 | 8/1967 | Gustafson | 172/456 |
| 3,491,836 | 1/1970 | Doepker | 172/456 X |
| 3,493,247 | 2/1970 | Tasset et al. | 172/456 X |
| 3,521,906 | 7/1970 | Parker | 172/311 X |
| 3,529,674 | 9/1970 | Todd et al. | 172/456 X |
| 3,620,550 | 11/1971 | Hornung | 172/311 X |
| 3,654,999 | 4/1972 | Fischer | 172/311 |
| 3,698,488 | 10/1972 | Yoder et al. | 172/456 X |
| 3,751,071 | 8/1973 | Patterson et al. | 172/481 X |
| 3,791,673 | 2/1974 | Hornung | 172/456 X |
| 3,810,660 | 5/1974 | Peterson | 172/456 X |
| 3,874,459 | 4/1975 | Herberholz | 172/456 X |
| 3,971,446 | 7/1976 | Nienburg | 172/311 |
| 3,982,773 | 9/1976 | Stufflebeam et al. | 172/456 X |

FOREIGN PATENT DOCUMENTS

| 218191 | 6/1957 | Australia | 172/626 |
|---|---|---|---|
| 282278 | 9/1966 | Australia | 172/311 |
| 1104246 | 4/1961 | Fed. Rep. of Germany | 111/57 |
| 36403 | 5/1954 | Poland | 111/57 |
| 36358 | 8/1954 | Poland | 111/57 |
| 540702 | 10/1941 | United Kingdom | 280/482 |

OTHER PUBLICATIONS

Page 8 & page 9, John Deere Operator's Manual, OM-A90-159.

Primary Examiner—Edgar S. Burr
Assistant Examiner—Steven A. Brattle

[57] ABSTRACT

A forwardly foldable agricultural planter includes a hitch shiftable as wing sectons are moved between transport and operational configurations. Rigid link tow bars pivot about centrally positioned pivots permitting the hitch to be horizontally shifted between transport and operational positions to thereby realize positive drawn implement control in both configurations. A telescoping drawbar provides further implement support and control and either manual or automatic latching mechanisms can be provided to secure the folded wing sections in position.

48 Claims, 16 Drawing Figures

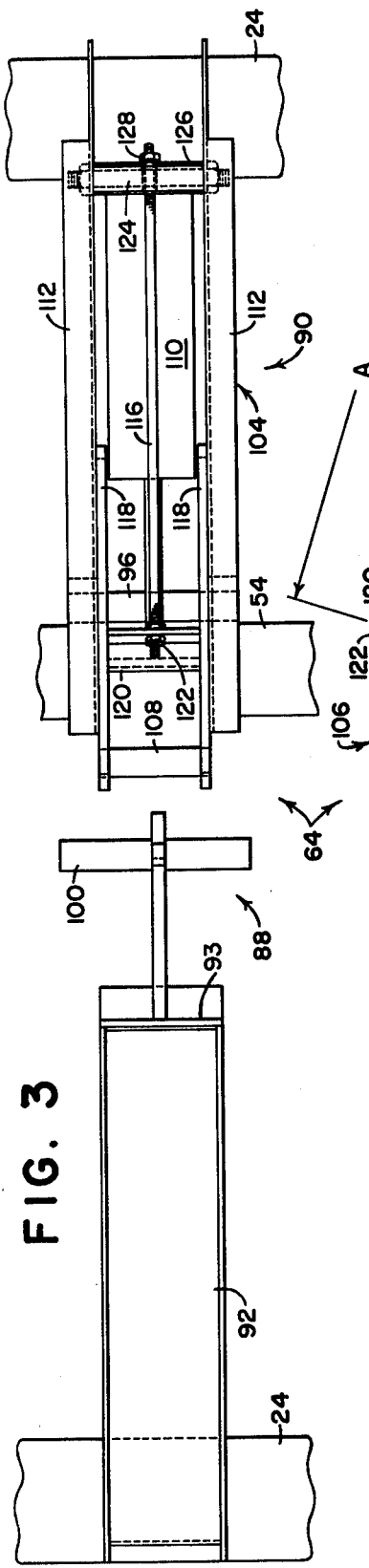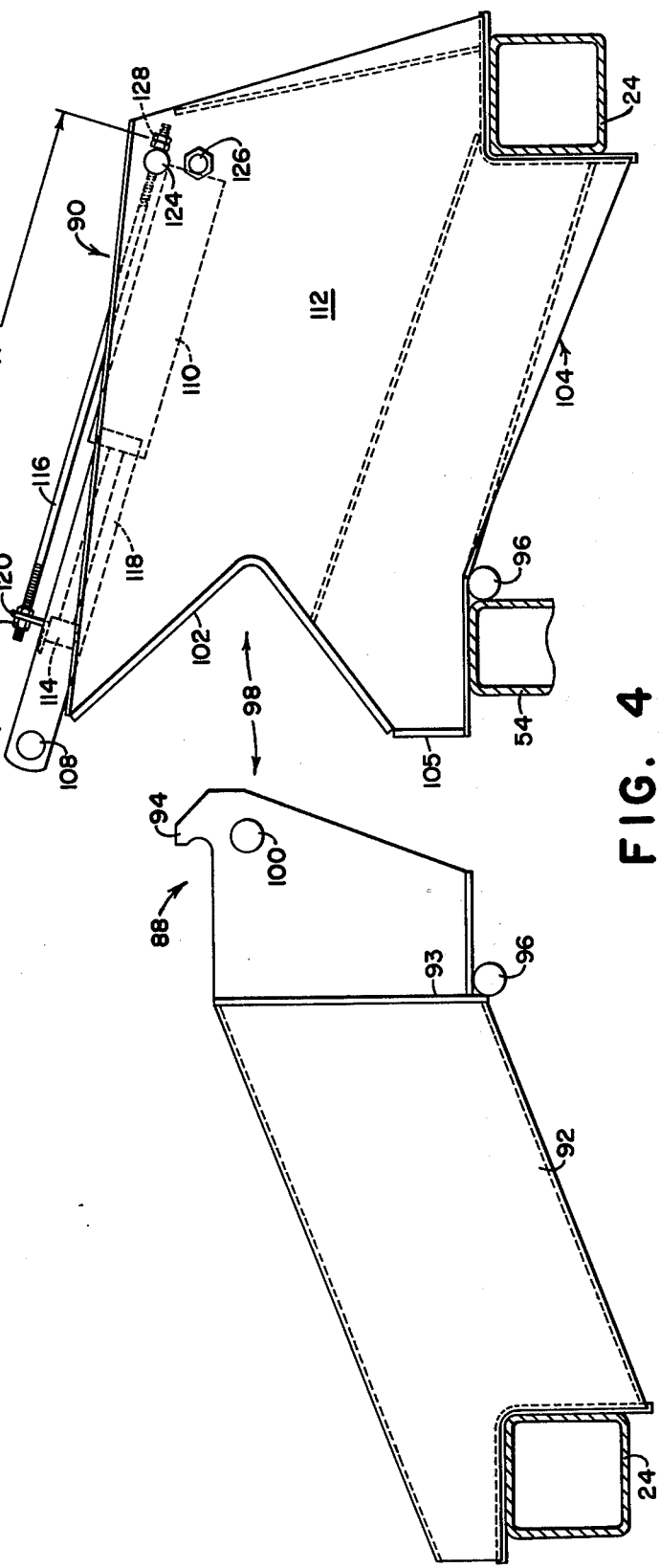

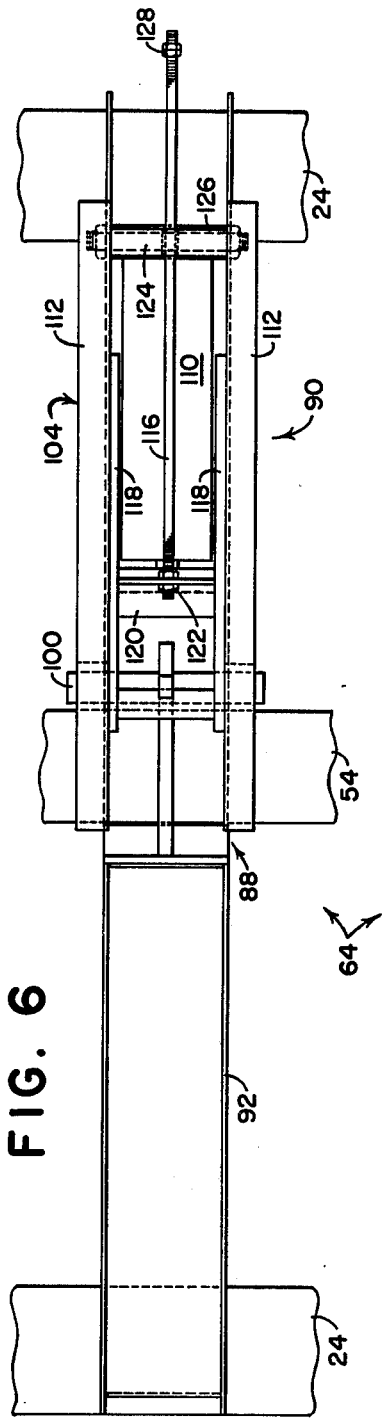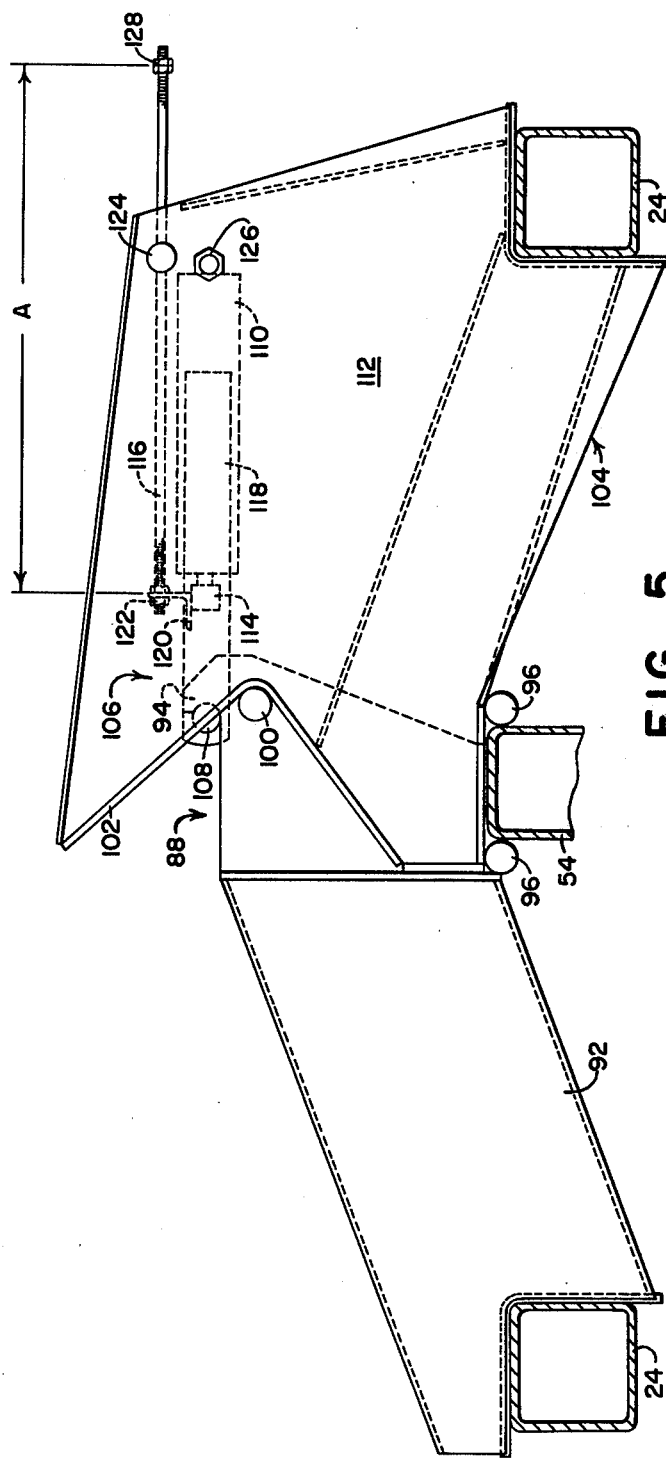
FIG. 6
FIG. 5

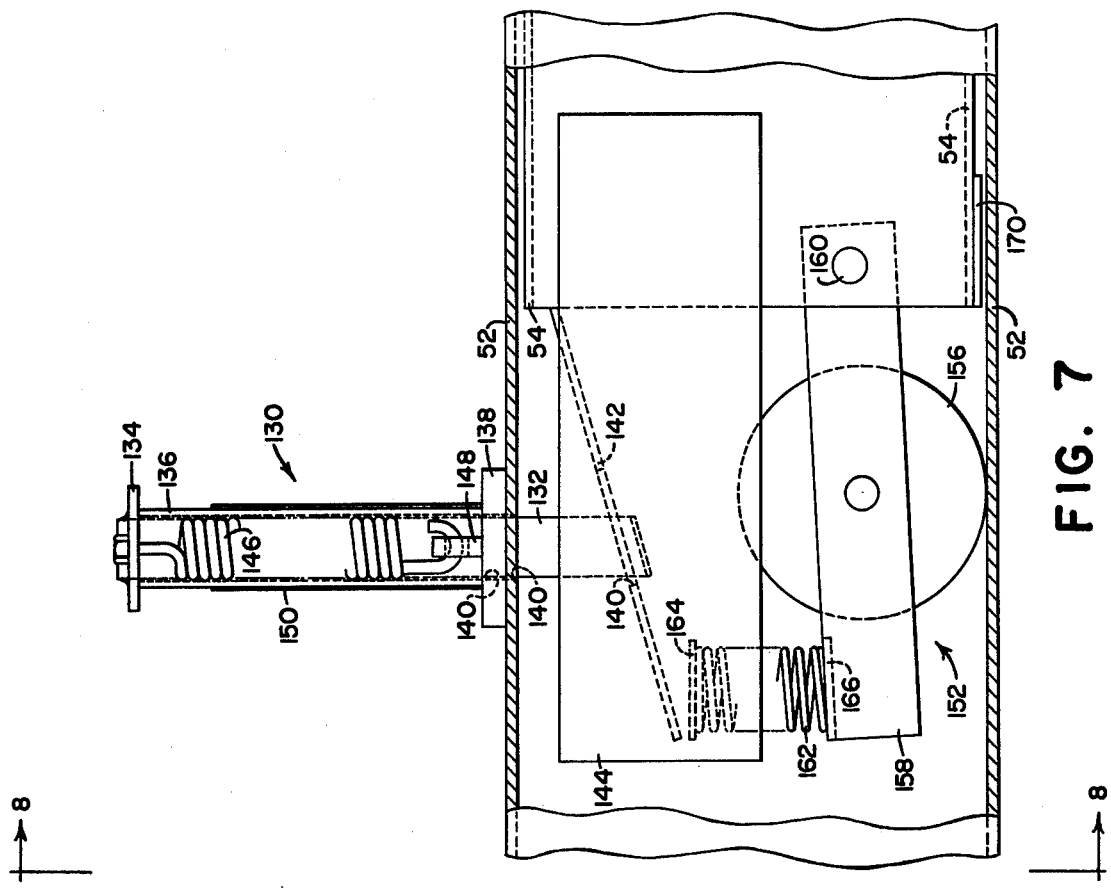
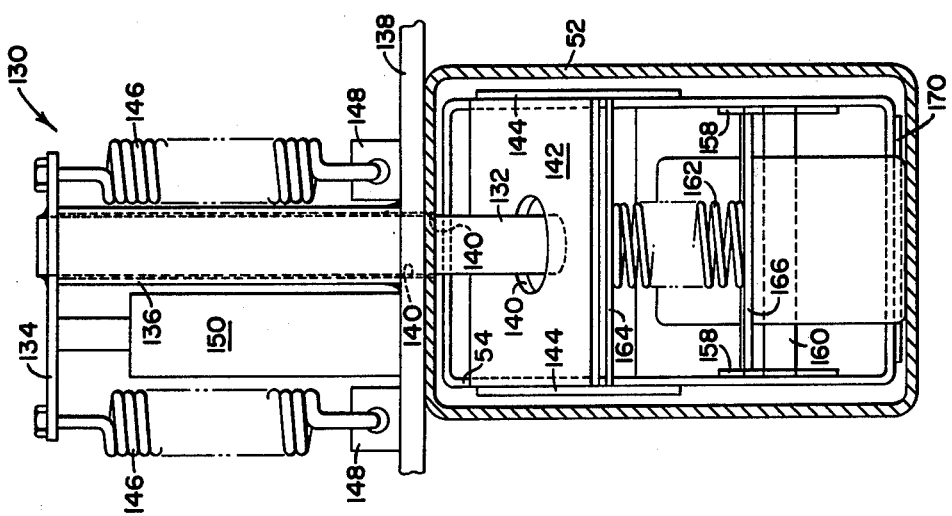

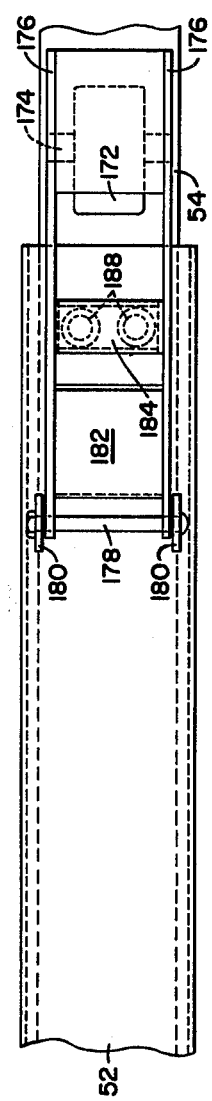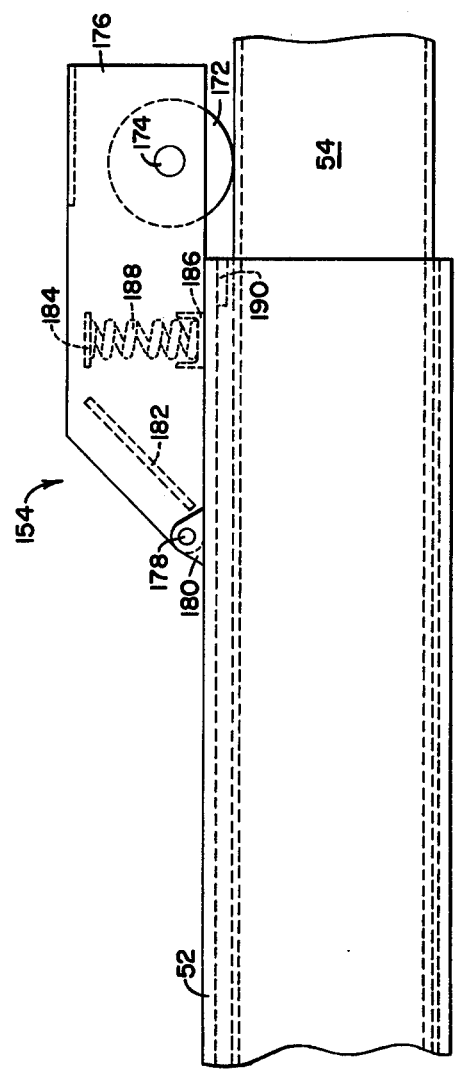

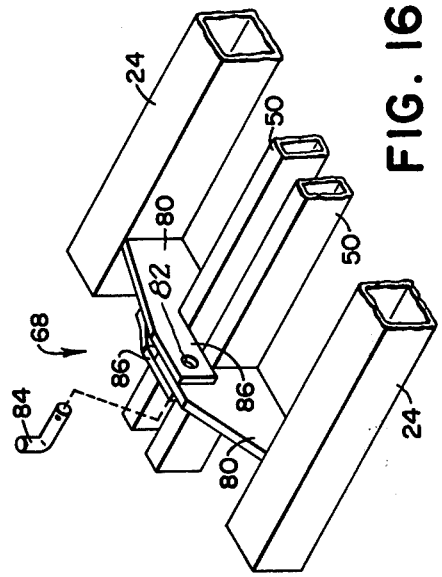
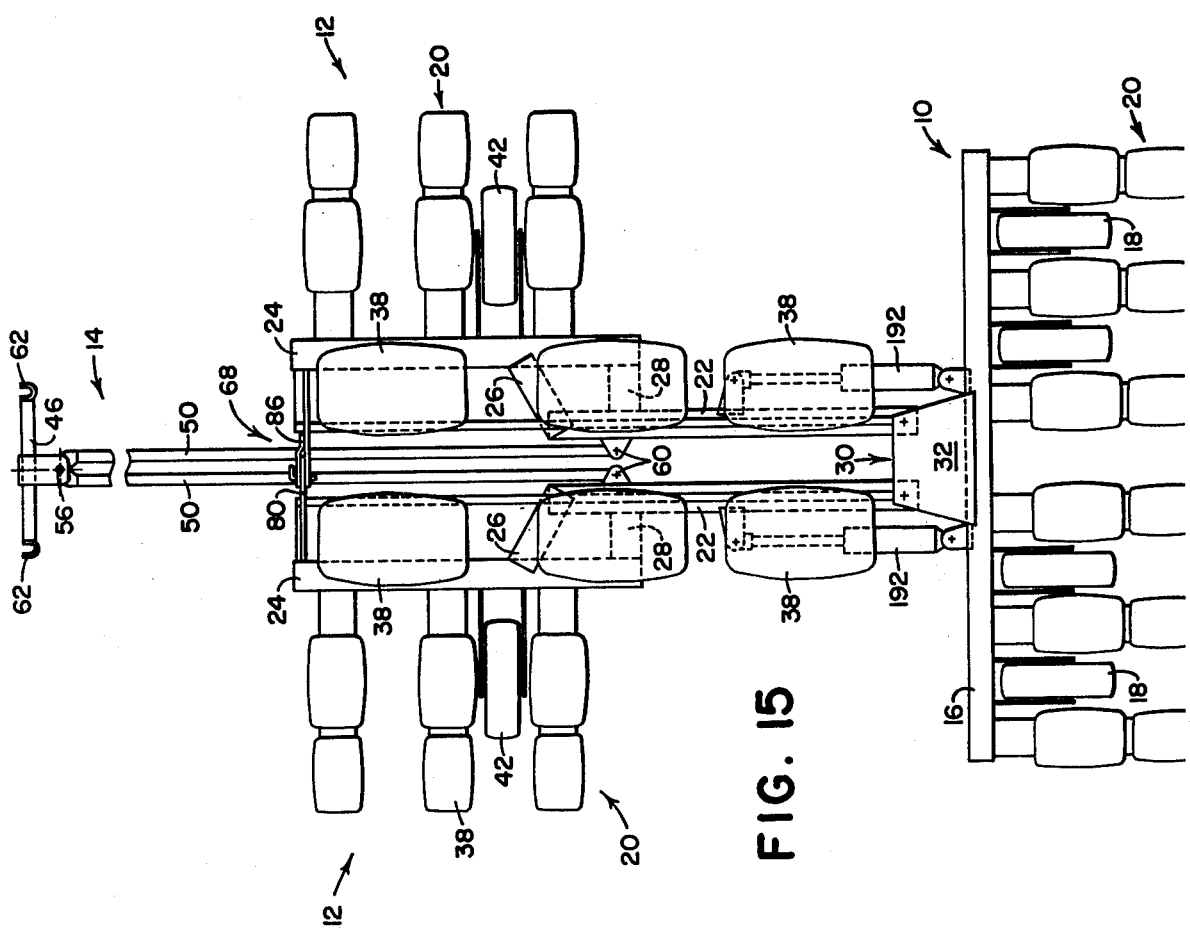

FORWARDLY FOLDABLE TOOLBAR

BACKGROUND OF THE INVENTION

The present invention relates generally to multi-section foldable agricultural implements and more specifically relates to a forwardly foldable implement designed to carry planter units.

As productivity becomes of increasing importance to the farmer, implement manufacturers must provide larger and wider implements designed to increase efficiency and output. As implements thus increase in size, transport and storage become more difficult.

Today several approaches are utilized to maximize implement width and yet minimize the storage and transport problems encountered. Many planter units are transported endwise while others utilize tandem hitch arrangements which permit adjacent sections to be joined prior to transport. Other units provide a cart or trailer on which the planter implement is transported and some manufacturers fold the planter frame either upwardly, rearwardly or forwardly. Each of these approaches, however, have encountered various problems when utilized with planter units.

Implements transported endwise are generally not folded prior to transport and accordingly have a transport length equal to their working width. As working width and therefore transport length is increased, transport maneuverability becomes more difficult since the unit will skid and tend to oversteer while being turned. Further, preparation of the unit for transport results in a considerable loss of operating time because the operating towbar on the implement front must be unhitched and the transport towbar on the implement end connected to the tractor.

Planters utilizing a tandem hitch arrangement can be effectively halved in length for transportation as the two sides are hitched together and then pulled either endwise or forwardly. To prepare this type of implement for transportation requires that the operator unhitch the unit, rearrange the sections and then rehitch the unit to his tractor. Accordingly, a considerable loss in operating time is encountered when this type of unit is converted between transport and field configurations.

Those planter units which utilize a cart or trailer for transporting the unit have the obvious disadvantage of additional expense incurred to provide a cart or trailer. Further, the operator incurs substantial lost time in moving the cart or trailer to the location of the planter when he is ready to move the planter to another field or to the storage site.

Many tillage implements such as cultivators and rod weeders are folded during transport and stoage. Recently available are implements having upwardly folding wing sections which transport and store the implement with its wing sections in a vertical position. The maximum width of the outer sections utilized in this type of implement is limited, however, since electrical wires and other types of overhanging obstacles present interference for folded outer sections. Unlike cultivators, planter units cannot easily be transported when elevated and rotated onto their sides since the seed and fertilizer contained in the hoppers spill. Further, the elevated units encounter significantly different stresses when suspended in this manner and thereby increase manufacturing and maintenance expenses. Such implements when folded also require some means of stabilizing the elevated wing sections thus further increasing the manufacturing costs and time lost by the operator in preparing the unit for transport or storage.

Another approach to providing more compact and transportable implements utilizes rearwardly folding wing sections. With this type of implement, the tools adjacent the section joints interfere with one another as the wing sections are folded rearwardly. Planter units extend rearwardly from the toolbar a distance greater than cultivator or other simple tillage units, and therefore the interference problem becomes even more significant. In addition, the trailing portion of rearwardly folding units have the tendency to skid during turns and maneuvers making them difficult to steer. To stabilize the trailing rear ends, a link or latch mechanism is generally provided. However, the operator has to dismount his tractor and secure the link or latch to lock the trailing sections together during the transport operation. While rearwardly folding implement frames provide a more simple solution to transport, the provision of planter units on rearwardly folding implements require that fertilizer drives and liquid tube distribution systems be disconnected when the wings are folded prior to actual transport.

It is also common to fold tillage and cultivator type units forwardly for transport. However, such implements cannot attain a very wide operating configuration unless the wing sections are of a significant length which then requires that a long hitch be provided between the tractor and the center frame. With the long hitch, however, the folded implement frame will not track well either during maneuvers in the field or during transport.

SUMMARY OF THE INVENTION

It is accordingly an object to provide a wide and forwardly foldable agricultural implement designed to carry row planter units. More specifically it is an object to provide a forwardly folding implement having a hitch structure shiftable between operational and transport positions to provide positive drawn implement control during both planting and transport operations. Further, it is an object to provide a folding implement which does not require separate carts or trailers during transport operations, but which utilizes its own ground-engaging support wheels.

It is also an object to provide a foldable implement frame having a compact transport configuration and a wide operating width configuration.

It is another object to provide a foldable implement frame which can be manually or automatically folded and latched into position for transport and then manually or automatically unlatched and unfolded in order to minimize the loss of time encountered during preparation stages.

An additional object includes the provision of a folding toolbar configuration which will eliminate interference between the tools or planter units between adjacent sections when folded and which will not require the fertilizer or seed meter drives or fluid tubes for liquid distribution to be manually disconnected.

It is yet another object to provide a folding toolbar implement frame having a telescoping drawbar to facilitate shifting of the hitch structure between transport and operational positions to thereby minimize the distances between the tractor and implement and thus reduce steering problems.

It is also an object of the present invention to provide a folding implement frame supported during transport between the center section ground-engaging wheels and the tractor to eliminate oversteer and tracking difficulties.

Yet another object is to provide an automatic wing locking mechanism for securing wing sections in their folded transport configuration and to also provide for a mechanism to raise the wing support wheels above the ground during transport and thereby improve transport tracking.

BRIEF DESCRIPTION OF THE DRAWINGS

The preferred embodiment of the invention will be described in conjunction with the accompanying drawings in which:

FIG. 3 is an enlarged plan view of the hydraulically operated side section latching means when not latched.

FIG. 4 is an enlarged side view of the hydraulic latching means shown in FIG. 3.

FIG. 5 is an enlarged side view of the hydraulic latching means when latched.

FIG. 6 is an enlarged plan view of the hydraulic latching means shown in FIG. 5.

FIG. 7 is a vertical sectional view of the drawbar locking pin means.

FIG. 8 is a view of the drawbar locking pin means taken generally along line 8—8 as shown in FIG. 7.

FIG. 9 is an enlarged plan view of the roller support on the drawbar rear section.

FIG. 10 is a side view of the roller support illustrated in FIG. 9.

FIG. 15 is a plan view similar to FIG. 14, but illustrating the implement in the folded position.

FIG. 16 is an expanded perspective of an alternate latching means for securing the outer sections together for transport.

DESCRIPTION OF THE PREFERRED EMBODIMENT

Figure 1:
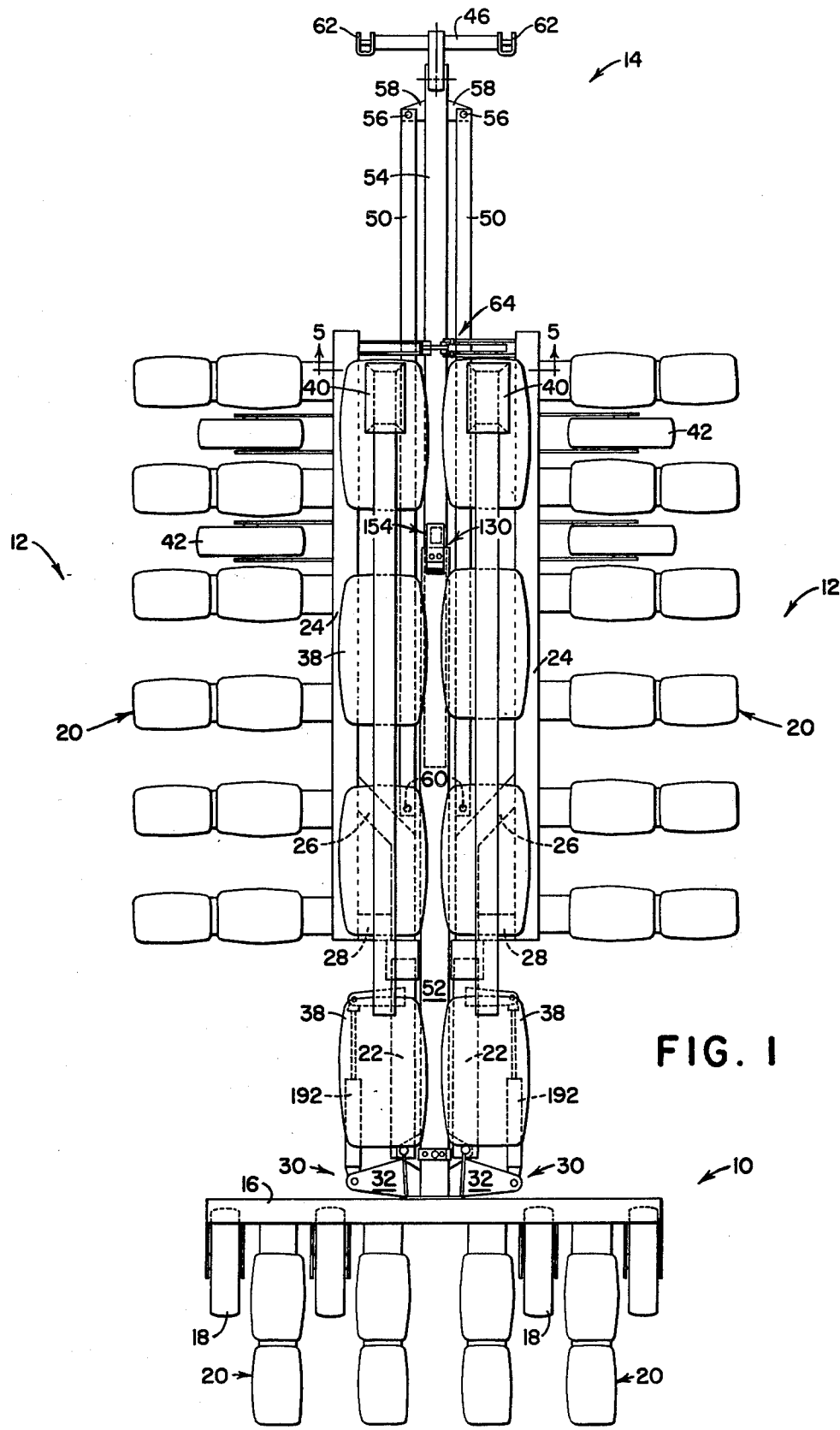
FIG. 1 is a plan view of the forwardly folding implement in the transport position.
Figure 2:
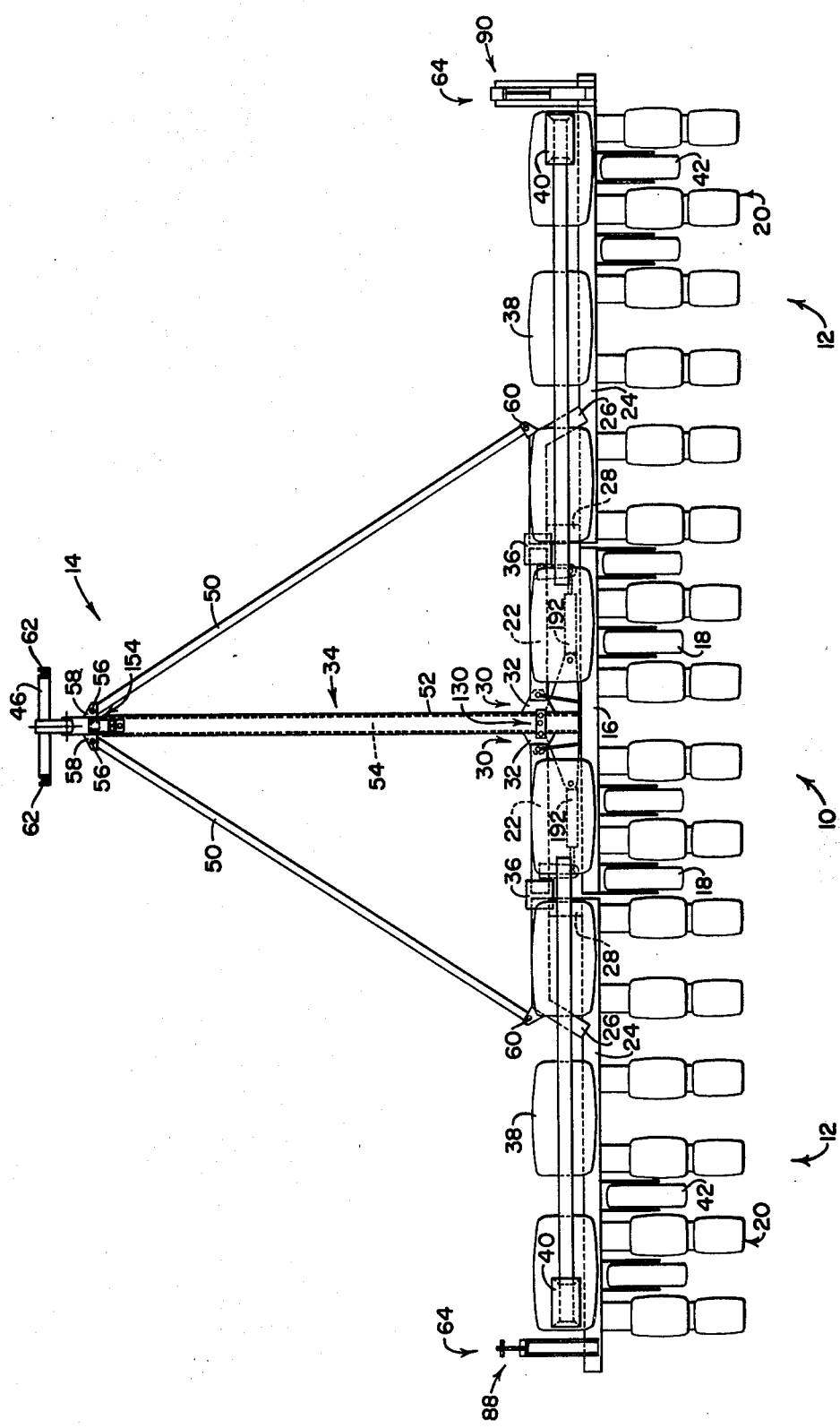
FIG. 2 is a plan view in a slightly smaller scale of the implement shown in FIG. 1 and in the operating position.
Figure 14:
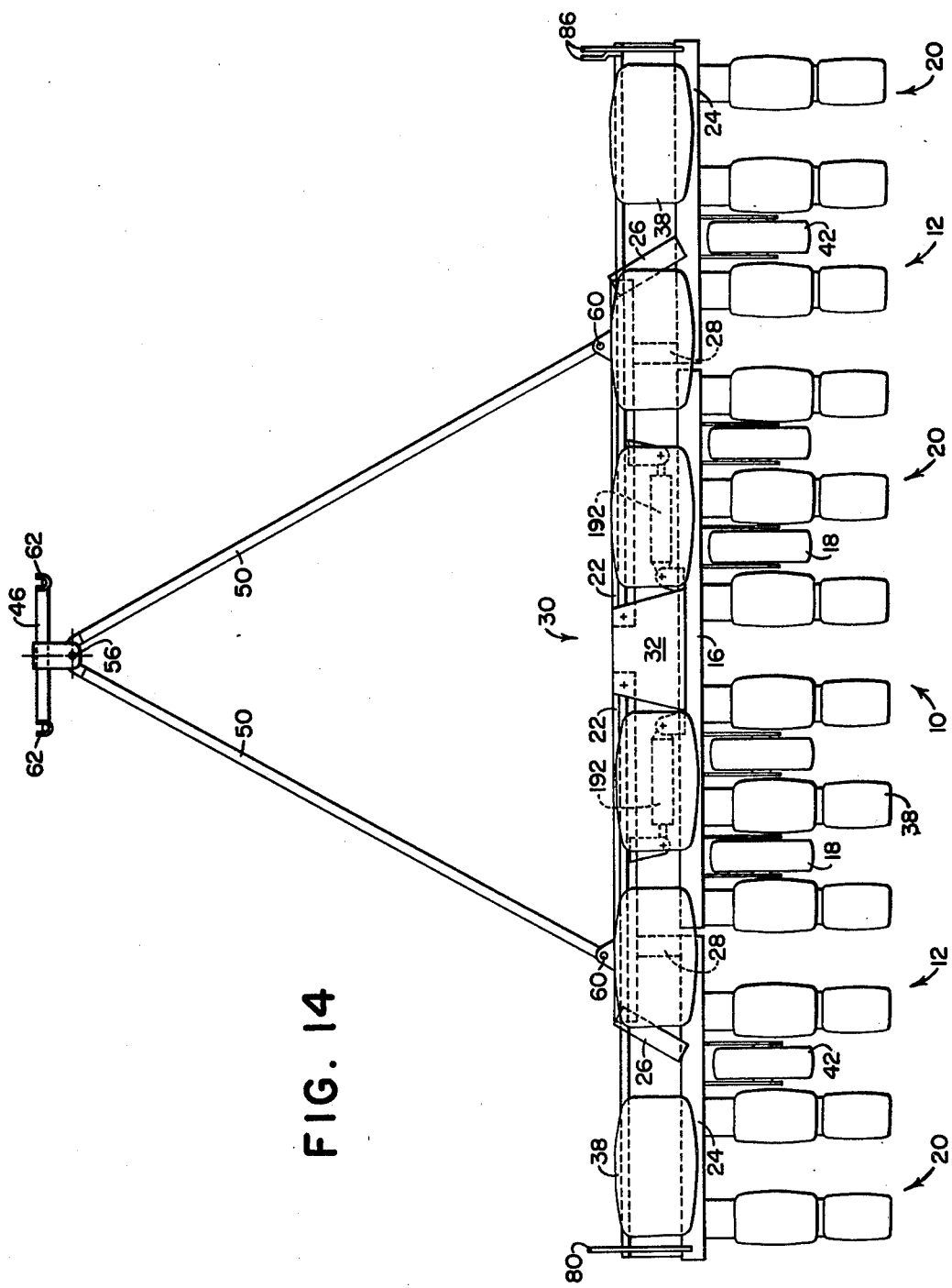
FIG. 14 is a plan view of an alternate embodiment in an operational position.

Referring now to the drawings, the preferred embodiment is illustrated in FIGS. 1 and 2 and an alternate embodiment is illustrated in FIGS. 14 and 15. In the following discussion, references made to this preferred embodiment will generally be true also for the alternate embodiment since they differ primarily in that the hitch means of the preferred embodiment includes a telescoping drawbar.

FIGS. 1 and 15 illustrate that the forwardly folding implement is comprised generally of an elongated central transverse horizontal section or main frame 10, a pair of elongated horizontal outer frames or sections 12 pivotally attached to the center section 10, and a fore-and-aft extending shiftable hitch means 14.

The central section 10 includes a transverse horizontal beam 16 supported on ground-engaging wheels 18. Extending rearwardly from the central beam 16 and mounted thereon are a plurality of planter units 20.

Turning now to FIGS. 2 and 14, there is illustrated a pair of horizontally elongated outer frame sections 12 pivotally connected to the central frame 10 and extending transversely outwardly therefrom. Each outer frame 12 also has a plurality of rearwardly extending planter units 20 mounted thereon. The outer sections 12 are comprised of inner and outer portions numbered respectively 22 and 24, both portions rigidly joined at their adjacent ends by truss members 26 and 28. Each outer section inner portion or beam 22 is parallel with its respective outer portion or beam 24 and when in the operational configuration, beam 24 is transversely aligned with the central beam 16 while beam 22 is parallel thereto and forwardly spaced thereof. Pivotally connecting each outer section 12 to the central section 10 for shiftable movement between a first fore-and-aft transport position, as shown in FIGS. 1 and 15, and a second transverse operation position, as shown in FIGS. 2 and 14, is a vertical pivotal means 30 including a horizontal plate 32 secured to the central section 10. Hydraulic cylinders 192 are used to shift the implement between its front folded position, as shown in FIGS. 1 and 15, and its working position, as shown in FIGS. 2 and 14, about the pivot means 30. As is readily apparent, each outer section 12 is pivotally connected to its respective pivotal plate 32 forward of the central section 10 and, in the preferred embodiment, outwardly spaced from the fore-and-aft extending drawbar 34 to facilitate forwardly folding of the outer section 12. A horizontal pivot 36 is provided in each outer section beam 22 of the preferred embodiment having a drawbar to permit relative vertical movement between the outer section 12 and central section 10 as ground contour changes are encountered by each during operation and transport. The pivot means 30 is positioned sufficiently inwardly of the ends of central frame 16 to permit major portions of the tools or planter units 20 to be within the transverse expanse of the central frame, such being shown clearly in FIGS. 1 and 15, when the outer frames are in their folded position.

Figure 11:
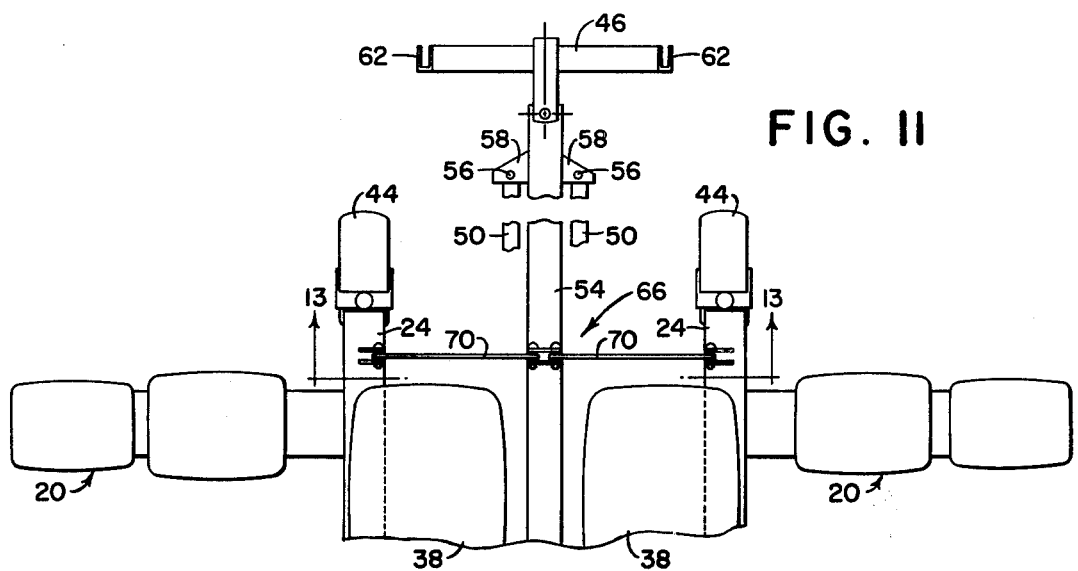
FIG. 11 is an enlarged partial plan view with portions broken away of a modified form of the invention and showing the folded side sections latched together by link and pin means.

A plurality of fertilizer hoppers or material carriers 38 are carried on the outer sections 12 for movement therewith as the section 12 is moved between transport and operational positions. The hoppers 38 are supported on the beams 22 and 24 and are aligned transversely to simplify filling, drives and the fertilizer distribution system. Carried by each outer section 12 and supported above the fertilizer hoppers 38 is a horizontal fertilizer auger conveyor 40 for distributing and filling each hopper 38. Provided, but not shown, for each outer section 12 are typical fertilizer distribution drives, openers and seed distribution mechanisms. Supporting each outer section 12 are ground-engaging support wheels 42 or alternatively as illustrated in FIG. 11 caster wheels 44 which permit the circular movement of each outer frame 12 as it is moved by folding cylinders 192 between operational and transport positions.

Connecting the central frame 10 in the preferred embodiment with the hitch structure 46 is a fore-and-aft extending telescoping drawbar 34 and a pair of rearwardly diverging drawbar links or link members 50. The drawbar 34 includes a rear section 52 rigidly secured at its rearward end with the central section or frame 10 and a telescoping front section 54 receivably carried by the rear section 52. The links 50 are pivotally connected at 56 to fin members 58 carried by the front telescoping section 54 and at their rearward ends at 60 to their respective outer sections. The hitch means 14 includes both telescoping sections 52 and 54 and the hitch structure 46 mounted in a conventional manner with the forward end of the front section 54. The hitch structure 46 has typical outer connecting members 62 for connection with the lift links of a conventional tractor three-point hitch. This hitch 46 enables the operator to raise the forward end of the drawbar 34 during folded transport so that the implement is supported on the central section wheels 18 and the tractor three-point hitch. Also, as will become apparent, the links 50 and the portions of beams 22 between the pivots 60 and the central pivot connections to the pivot plate 32 serve as folding links or linkages with one folding link 22 being rigid with the respective outer sections 12.

In the alternate embodiment illustrated in FIGS. 14 and 15, no drawbar is provided. This embodiment is provided for smaller planter units and does not require the drawbar structure either for towing or for support of the outer sections 12 during transport. Structurally it is similar to the preferred embodiment and functionally it folds and unfolds in the same manner as the hitch structure 46 is horizontally shifted to rotate the outer sections 12 about the pivotal means 30. No horizontal pivot similar to 36 in the preferred embodiment is necessary since the outer sections 12 must support their own weight during transport.

Figure 13:
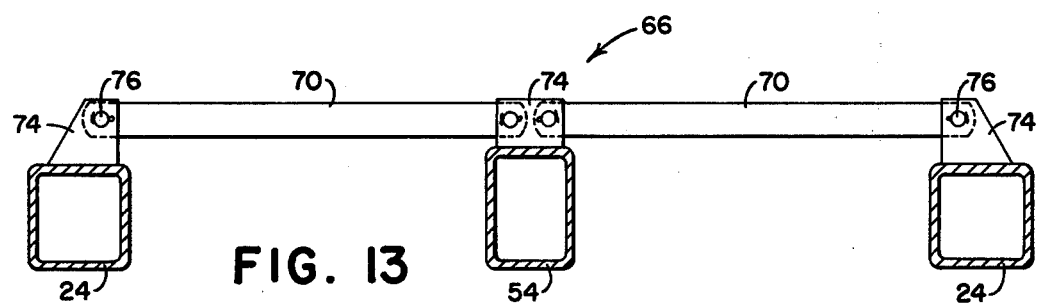
FIG. 13 is an enlarged sectional view, taken along line 13—13 of FIG. 11, of the link and bracket fastening means.

Each outer section 12 is provided with means for securing the folded sections 12 together and for supporting the forward ends of the section 12 on either the drawbar 34 (FIGS. 1 and 2) or link members 50 (FIGS. 14 and 15). Provision is made in the preferred embodiment for latching means 64 to hydraulically and automatically secure the folded outer sections 12 over the drawbar 34. Alternative brace latching means 66 and 68 are illustrated in FIGS. 11, 12, 13 and 16, and could be provided for the operator who prefers a manual latching mechanism. When the hydraulic means 64 for securing the frames 12 in their folded position is utilized, the outer sections 12 are supported on the drawbar 34 and the drawbar 34 is carried between the tractor three-point hitch and the central section 10 during transport. When the brace latching means 66 illustrated in FIG. 13 is adopted, caster wheels 44 as illustrated in FIG. 11 could be provided on each outer section 12 to support during transport the weight of outer sections 12.

Figure 12:
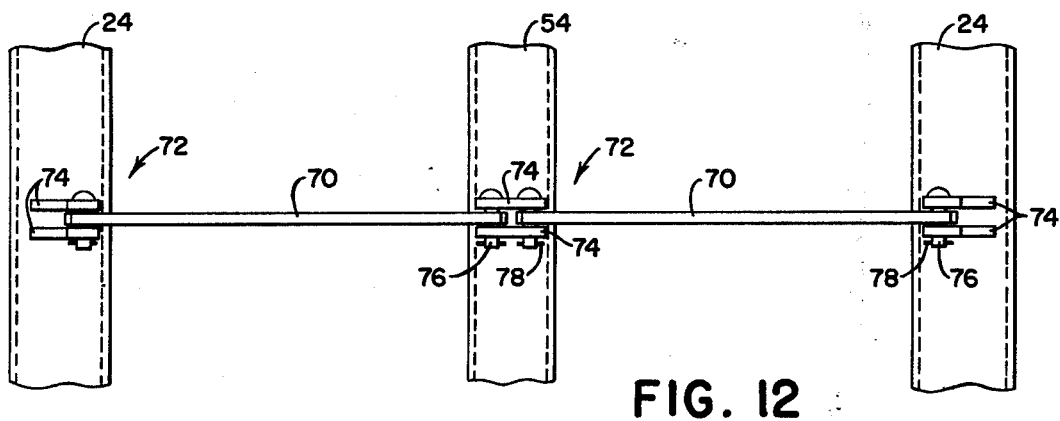
FIG. 12 is an enlarged plan view of the link and bracket fastening means shown in FIG. 11.

Referring now to FIGS. 11, 12 and 13, alternate brace latching means 66 is illustrated and includes a rigid link 70 releasably securable between the drawbar 34 and each outer section 12. Rigidly secured to and carried by each outer section 12 and the drawbar 34 are brackets 72 for releasably securing one end portion of the rigid link 70. As is best illustrated in FIGS. 12 and 13, the brackets 72 include upstanding ear members 74 having openings therein. The ends of each rigid link 70 include openings compatable with the bracket openings for receiving lock pins 76 held in place by cotter pins 78 or similar means.

In FIG. 16, the second alternate latching means 68 is illustrated for manually securing the outer sections 12 together and also for supporting said sections 12 on the drawbar links 50. This means includes simple arm members 80 secured to each section outer portion 24 and having a horizontal opening 82 for locking pin 84 to secure them together. The arm members 80 include projecting necks 86 which horizontally support their respective outer sections 12 on the drawbar links 50 when the section wheels 42 are retracted and the tractor three-point hitch is raised to transport the implement.

The preferred hydraulic latching means 64 is best illustrated in FIGS. 3, 4, 5, and 6. This latching means 64 can be adapted to either implement illustrated in FIG. 1 or 15. The outer sections 12 carry complementary-shaped latching elements 88 and 90 for automatically and rigidly locking the outer sections 12 together and for supporting them on the drawbar 34 during transport. As illustrated in FIG. 4, the left outer section 12 carries an upwardly inclined support arm 92. The support arm 92 carries a horizontally opening C-shaped catch or hook 94. Further supported by the arm 92 at its bottom is a horizontally solid rod 96 which abuts against the drawbar front section 54 (see FIG. 5) to position the frame 12 over the drawbar 34. Acting between the frames 12 to position them for latching are complementary-shaped positioning means 98 including a horizontal stop bar 100 carried by arm 92 and receivable in a V-shaped jaw 102 of a second upwardly inclined support arm 104 carried by the right outer section 12.

A power operated latching member 106 acts to secure the frames 12 together after they are positioned. This latching member 106 includes a latch pin 108 carried by the rod end of a hydraulic cylinder 110 which in turn is pivotally supported between the vertical plates 112 which form the arm 104. Block 114 joins control rod 116 with cylinder 110 to define the path of movement of the latching pin 108 as the cylinder 110 extends and retracts. A pair of parallel straps 118 are secured to block 114 and support at their outer ends the horizontally extending latching pin 108. The straps 118 are comprised of elongated rectangular members positioned parallel to the plates 112 of the second arm 104, and have sufficient separation and sufficient length to overlap (as shown in FIG. 3) the body of the hydraulic cylinder 110 when the ram is fully extended. In this way, the rectangle formed by the sides of the strap 118 will abut the hydraulic cylinder 110 or vertical parallel plates 112 as the hydraulic cylinder 110 rod tends to turn during extension and retraction and will thereby prevent rotation of the rod to retain the latching pin 108 in the desired horizontal latching orientation.

Vertically spaced above the hydraulic cylinder 110 is the control rod 116. The rod 116 is adjustably secured to the block 114 by the angle member 120. The rod 116 passes through an opening in the vertical portion of the angle member 120 and is threaded at its end to receive positioning nuts 122 which can be adjusted in the usual fashion to adjust the effective length of the rod 116. The other end of the control rod 116 is slidably supported in an opening passing through the width of rod pivot pin 124 which is in turn pivotally supported by and between the plates 112 of the second arm 104 above the hydraulic cylinder pivotal support 126. This end of the control rod 116 is also threaded and provided with a nut 128 to adjust the effective length of the control rod 116 between the pin 124 and the angle member 120 or hydraulic cylinder rod end (length designated A). With the control rod 116 pivotable about a point vertically spaced above the hydraulic cylinder pivotal support 126 and with the control rod 116 end fixed to the hydraulic cylinder ram end, and further with both the rod 116 and ram moving in the same vertical plane, extension of the hydraulic cylinder 110 will cause the latch pin 108 to move first outwardly and then upwardly after the fixed control rod 116 length (distance A) equals the extended hydraulic cylinder ram length.

As the outer sections 12 are moved between their folded and operational configuration, the hitch means 14 is shifted between forwardly extended and rearwardly positions (see FIGS. 1 and 2). When the implement is folded as illustrated in FIG. 1, the front drawbar section 54 will be telescopically extended, but when the implement is operational as illustrated in FIG. 2, the section 54 will be retractably contained within the rear section 52. During transport (see FIG. 1), the towing forces advancing the implement will be exerted along the drawbar links 50, through the beam 22, and then through the pivot plates 32 and drawbar section 52 to the central section frame 16. Therefore, the drawbar sections 52 and 54 need not be fastened together during transport.

However, there can be provided hydraulic or mechanical means for releasably latching the hitch drawbar sections 52 and 54 in a retracted position during the planting operation. A mechanical locking pin means 130 is illustrated in FIGS. 7 and 8 and includes a pin member 132 fixed to and vertically suspended beneath a horizontal mounting plate 134 carried at the rear portion of the drawbar rear section 52 (see FIG. 1). The pin member 132 is guided by cylinder 136 fixed to the base plate 138 and is receivable through vertically alignable openings 140 provided in the base plate 138, the drawbar rear section 52 and in an inclined plate member 142 secured to the rearwardly end of the telescoping drawbar front section 54. The inclined plate member 142 is welded to side plate 144 fixed to the telescoping section 54 side walls and is upwardly inclined from rear to front to assure engagement with the pin member 132 when the telescoping section 54 is slidably telescoped rearwardly into the rear section 52. The locking pin means 130 serves also to lock or hold the outer sections 12 in working positions since it fixes the respective drawbar links 50 from shifting forward with respect to the drawbar section 54. The links 50 thereby restrain or hold the outer sections 12 from folding forwardly.

A biasing means including a pair of coiled springs 146 is used for urging the pin member 132 downwardly. The springs 146 are supported between the mounting plate 134 and blocks 148, the latter being secured to a base plate 138 mounted on drawbar rear section 52. To prevent downward movement of the horizontal plate 134 and the pin member 132, and to disengage the pin member 132 when it is in a locked position, a single-acting hydraulic cylinder 150 is mounted between the plates 134 and 138.

To assure sliding movement between the telescoping front section 54 and rear section 52, two sets of roller means 152 and 154 are provided, one set at the unsecured forward end of the rear section 52 and the other at the unsecured rearward end of the telescoping front section 54. At the rear end of the front section 54 (see FIGS. 7 and 8) is provided a wheel member 156 carried by arm 158 which is pivotally carried by pin 160 and fixed to the side walls of the section 54. A spring means 162 is positioned rearwardly of the wheel member 156 and is supported between upper and lower horizontal plates numbered respectively 164 and 166 fixed between the wheel member arms 158 and the side plates 144 secured to and extending rearwardly from the front section 54 rearward end. During telescoping movement, the spring means 162 acts to urge the wheel 156 downwardly but will permit it to move up when the front section 54 is in its extended position within the rear section 52 and lifted at its forward end for transport. As the forward end of section 54 is lifted, the bottom plate 170 welded to the front section 54 bottom will abut the section 52 bottom wall and absorb the compression forces resulting from the lift to prevent damage.

A similar wheel member 172 is carried by the rear section 52 at its forward end to aid the telescoping of the front 54 and rear 52 sections at this joint (see FIGS. 9 and 10). Comprising that mechanism is the second wheel member 172 supported on a shaft 174. The shaft 174 is carried by a pair of parallel vertical plates 176 pivotally mounted by pin 178 on ear brackets 180 projecting from the upper surface of the section 52. Rigidly joining the two plates 176 is a rear brace 182 and upper horizontal plate 184. A spring mount 186 is fixed directly beneath plate 184 and is fixed to section 52. Positioned between the mounts 184 and 186 are helical springs 188. The roller wheel 172 may rock upwardly and counterclockwise about the pivot pin 178 when the vertical forces encountered by the wheel 172 exceed the pressure exerted by the coiled spring 188. This may occur upon the section 54 being lifted. A stop plate 190 is provided to prevent structural damage of either section 52 or 54 during lift and transport.

In the alternate embodiment having no central or telescoping drawbar, the hydraulic system can be provided with conventional valving means, not illustrated, for hydraulic cylinders 192 to lock the outer sections 12 in either the folded or operational configuration. With this system, no other locking means is required to maintain the outer sections 12 transverse to the center section 10 during planting operations even though the drawbar links 50 advance the implement by exerting towing forces transversely spaced from the pivotal means joining the central 10 and outer sections 12. This means for locking the wings in position could also be provided in place of the locking pin means 130 on the preferred embodiment, as might be particularly desirable when a fewer number of planter units are utilized. As in the previous form, the links 50 and beam portions 22 of the outer sections serve as folding links or linkages with each folding link or beam portion 22 being rigid with the frame of the respective outer section.

In operation the implement is normally towed behind a tractor having a vertical lift hitch system that is connectible to the connecting members 62. The outer sections 12 extend transversely and have their rear beam members 24 transversely aligned with the center section beam 16 such that the planter units 20 attached to all sections 10 and 12 are transversely aligned. Also in this configuration the locking pin means 130 between the drawbar front section 54 and its surrounding rear section 52 will be engaged and the towing forces will act through the drawbar and links 50 to pull the implement through the field. As the operator moves the implement forwardly over the field, the center section 10 will be supported by its ground-engaging wheels 18 and the side sections 12 will be supported by their respective ground-engaging support wheels 42. To prepare the unit for transport upon reaching the end of the field, the operator activates the single-acting hydraulic cylinder 150 to raise the horizontal locking pin member 132 from the aligned openings 140 in the section 52, section 54 and plate member 142. Extending the telescoping hitch sections 52 and 54 will cause the links 50 to pull on the outer frames 24 thereby urging the outer sections 12 to swing or fold forwardly about the pivotal means 30. In some instances, depending on the type and weight of the implements or tools carried on the frames 12, hydraulic folding cylinders 192 between the center section 10 and outer sections 12 may be used. As the cylinders 192 are extended the telescoping section 54 will move on the roller wheels 156 and 172. As the frames 12 begin to rotate about the pivotal means 30, the operator can slowly move the tractor to permit the drawbar sections 52 and 54 to telescopically move. As each outer section 12 is rotated forwardly, its respective ground-engaging support wheels 42 will carry it. When caster wheels 44 are used, they will caster as the outer section 12 swings around. When ground-engaging support wheels 42 are utilized as illustrated in the preferred embodiment of FIGS. 1 and 15, they will skid slightly as the outer sections 12 shift around to a fore-and-aft position. Upon completion of the folding operation, the sections 12 are latched together.

If the implement is provided with a manual latching or brace means 66, the operator simply dismounts his tractor and latches links 70 to the brackets 72 on the drawbar 34 and beams 24 to secure the outer sections 12 for transport. During transport the caster wheels 44 support the weight of the outer sections 12. With this means of support, the implement need not be connected to a three-point hitching means. When latching means 68 is provided, the pin 84 will be used to manually secure the arms 80 together.

When the implement is provided with the power operated latching means 64 shown in FIGS. 3-6, the outer sections 12 are folded as discussed above and it does not require that the operator dismount his tractor. To latch the outer sections 12 together with this means, the operator first extends the hydraulic cylinder 110 to raise the latch pin 108. The tractor is then driven forwardly to extend the telescoping sections 52 and 54. The hydraulic folding cylinders 192 are then activated to finish folding the outer sections 12 and bring the C-shaped hook 94 carried by the first support arm 92 as close to the V-shaped jaws 102 as possible.

To latch the support arms 92 and 104 together, the hydraulic latching cylinder 110, which at this time occupies a position approximately as illustrated in FIG. 4, is retracted. The control rod 116 slides through its mounting pin 124 as the cylinder 110 retracts. This causes the hydraulic cylinder ram and latching pin 108 to descend or rotate counterclockwise about the pivot pin 124. The pin 108 contacts the upper flat surface of the arm 92 and slides therealong to seat in the C-shaped hook 94. Continued retraction of the hydraulic cylinder 110 draws the horizontal stop bar 100 into the V-shaped jaws 102. During this portion of the locking stage, the support arms 92 and 104 are drawn together, and vertical surface 105 abuts complementary surface 93 carried by arm 92 to position the arms 92-104 for latching. Upon completion of the locking procedure the operator retracts the outer section ground wheels 42 and then raises the drawbar 34 with the tractor three-point hitch to position it between the positioning rods 96. The drawbar 34, of course, elevates the outer units as it is raised. Thus, the drawbar 34 is used to support the outer sections 12 when they are in their folded or transport positions.

To unlatch the brace means 64, the outer section wheels 42 are first extended and the hitch 46 is lowered slightly. The locking hydraulic cylinder 10 is extended and the latch pin 108 initially slides out of the C-shaped hook 94. As the cylinder 110 continues to extend and upon the control rod 116 reaching its limit of movement through its pivot pin 124, the pin 108 is swung upwardly and clear of the hook 94. The two outer section 12 can then be unfolded for operation.

To unfold the outer sections 12, the hydraulic folding cylinders 192 are retracted and the front section 54 is telescoped into the rear section 52 until the rearward end of the front section 54 abuts the wall of the center section 10 to position the drawbar sections 52 and 54 for latching. As the drawbar sections 52 and 54 are telescoped, the center section will move slightly. To prevent this movement the operator can move his tractor during the folding procedure. To lock the front section 54 with the rear section 52 the mechanical drawbar latching pin means 130 can be utilized or a conventional hydraulic valving system can be used to prevent movement of the folding cylinders 192. If folding cylinders 192 are not used, the retracting of the telescoping hitch members 52 and 54 by backing the tractor will cause the links 50 to urge the outer sections 12 outwardly.

Because all fertilizer hoppers 38 are carried on the outer sections 12, any drive provided for the fertilizer distribution system need not be disconnected when the side sections 12 are folded or unfolded. Similarly, to avoid the necessity of disconnecting the seed meter drive system, a quick disconnect and couple device can be utilized between the center section 10 and the outer sections 12. As the outer sections 12 would then be rotated forwardly that coupling would be automatically disconnected.

I claim:

1. A forwardly folding agricultural implement comprising: a central transverse horizontal frame having ground wheels thereon; a pair of horizontal outer frames; tools supported on the central and outer frames; and projecting rearwardly therefrom when in working position; vertical pivot means carried by the central frame inwardly of its outer ends at distances with respect to the outer ends substantially equal to a major portion of the rearward expanse of the tools on the outer frames when they are in their working position; means connecting the outer frames with the pivot means for movement between a first fowardly folded position in which the major portions of said tools on the respective outer frames are within the transverse expanse of the central frame and a second transversely extending position; powered folding means between the central and outer frames for moving the latter between their first and second positions; locking means between the central and outer frames for securing the latter in their second position; and hitch means adapted for connection to and support by a tractor and including a pair of drawbar links extending in diverging relation from forward ends joined together to rear ends connected to respective outer frames outwardly of the vertical pivot means.

2. The invention defined in claim 1 wherein the hitch means further includes a telescoping member having front and rear sections, the rear section connected with the central frame and the front section connected with a hitch structure.

3. The invention defined in claim 1 wherein the vertical pivot means is carried on the central and forward portion of the central frame and the outer frames include inner and outer portions, the inner portions connected to the pivot means and the outer portions connected with said inner portions so as to be aligned with the central frame when the outer frames are in their second position.

4. The invention defined in claim 3 wherein the tools supported on the outer frames include a plurality of material carriers spaced along their inner and outer portions, said carriers transversely aligned when said frames are in their second position.

5. The invention defined in claim 1 wherein the length of each link exceeds the length of the portion of the respective outer frame extending between the respective pivotal connection between the link and said frame and the outer end of the respective outer frame.

6. The invention defined in claim 1 wherein the tools on the central and outer frames include a plurality of earth engaging row units and material carriers, said units and material carriers on each frame being transversely aligned with the respective row units and material carriers on the other frames when the outer frames are in their second position.

7. The invention defined in claim 1 in which the rearwardly projecting tools are earth engaging row units mounted in transversely spaced relation along the central and outer frames and transversely aligned material containers associated with the respective row units for feeding material to the ground areas in which the row units are working, and further characterized by at least part of the containers being carried on the outer frames forwardly of the central frame.

8. The invention defined in claim 7 characterized by the respective row units depending from and extending rearwardly from the central and outer frames, and by the material containers being suspended on the outer frames in a forward and vertical offset relation to said frames, and said outer frames have inner portions forwardly offset with respect to the central frame which suspend the respective containers mounted thereon in transverse alignment with those on the outer frames.

9. The invention defined in claim 1 in which complementary latch elements are provided on the respective outer frames, each of which engage the elements on the other outer frame and guide said frames to substantially the same height upon said outer frames being shifted to their folded position.

10. The invention defined in claim 1 wherein each outer frame portion between the vertical pivot means and the connection to a respective drawbar link composes a folding link, rigid with the outer frame, and the powered folding means acts between said folding link and the central frame to shift the folding link, its respective drawbar link and the outer frame.

11. The invention defined in claim 10 wherein the combined length of the folding link and its drawbar link exceed the width of their respective outer frame.

12. The invention defined in claim 10 wherein the powered folding means is connected to the folding link rearwardly of the vertical pivot means.

13. The invention defined in claim 1 wherein the vertical pivot means is a pair of vertical pivot structures carried at the forwardly edge of the central frame, one pivot structure mounted adjacent each side of the fore-and-aft center line through the central frame.

14. The invention defined in claim 13 wherein the outer frames are mounted on respective pivot structures and when in their first folded positions occupy generally parallel fore-and-aft extending positions adjacent the fore-and-aft center line.

15. The invention defined in claim 14 wherein the tools on the outer frames are a plurality of earth engaging row units, said units extending rearwardly when the frames are in their second positions and transversely when the frames are in their first positions.

16. In a forwardly folding agricultural implement having a transverse horizontal main frame having ground wheels thereon and a pair of outer horizontal frames connected therewith, one outer frame extending transversely outwardly beyond each end of said main frame and tools supported on the central and outer frames and projecting rearwardly therefrom when in their working position, the improvement comprising means for positioning said outer frames in either a first position folded forwardly of the main frame or a second transverse position, including: vertical pivot means carried by the main frame inwardly of its ends at distances with respect to the outer ends of the central frame at least equal to a major portion of the rearward expanse of the tools on the outer frames when in their working position and at distances sufficient to permit the major portions of the tools on the respective outer frames to be within the transverse expanse of the main frame when the outer frames are in their first position, means connecting the outer frames with the pivot means to permit the former to be moved between their first and second positions; releasable locking means between the main and outer frames to maintain the latter in their transverse position; and drawbar means including a hitch structure adapted for connection to and for support on a tractor, said drawbar means further including a pair of link members pivotally coupled with the hitch structure, and extending rearwardly to pivotal connections with respective outer frames outwardly spaced of the pivot means, said hitch structure being forwardly and horizontally shiftable with respect to the central frame when the outer frames are moved between their second and first positions and rearwardly and horizontally shiftable with respect to the central frame as said outer frames are moved between their first and second positions.

17. The invention defined in claim 16 wherein the outer frames carry means for securing said frames together in their folded position, said means further supporting the frames on the link members during transport.

18. The invention defined in claim 16 wherein the drawbar means is further characterized as having telescoping front and rear sections between the hitch structure and main frame, the rear section rigidly connected to the main frame and slidable along the front section upon movement of the outer frames between their second and first position.

19. The invention defined in claim 18 wherein there is further provided releasable locking structure between the sections to secure them in a retracted relation.

20. The invention defined in claim 16 wherein the length of each link member is greater than the length of the portion of its respective outer frame extending between its outer end and the pivotal connection of the link with said outer frame.

21. The invention defined in claim 16 further provided with latching means carried by the outer frames for securing said frames together when in their first position.

22. A foldable agricultural implement comprising: a central transverse horizontal section having ground wheels thereon; vertical pivotal means carried by the central section inwardly of its ends; a pair of horizontal outer sections coupled with the pivotal means each section movable between a first forwardly folded fore-and-aft position and a second transverse position; tools suspended by said central and outer sections to project rearwardly therefrom when in their working positions; said vertical pivotal means being spaced from the respective ends of the central section at distances with respect to the outer ends substantially equal to the major portion of the distance the tools project rearwardly from the outer sections when in their working position and at distances sufficient to permit the major portions of said tools on the outer sections to be within the transverse expanse of the central section when the outer sections are in their forwardly folded position; hitch means adapted for connection to and for support on a tractor and including a pair of rearwardly extending link members, joined at their respective forward ends and pivotally connected at their respective rearward ends with an outer section outwardly spaced of the pivotal means; powered folding means between the central section and outer sections for moving said outer sections between their first and second positions; locking means to releasably secure the outer sections in their second position; and latching means carried on the ends of said outer sections and connectible to the link members when said sections are in their first folded position to secure said section ends together and support said section ends on said link members whereby said implement when in its folded position is supported at its forward end by the hitch means and at its rear end by said central section.

23. The invention defined in claim 22 wherein the hitch means includes a hitch supporting the link members at their forward ends, said hitch adapted for connection to a vertically shiftable support means carried by a tractor to permit outer ends of the outer sections to be elevated for transport by the tractor support means.

24. The invention defined in claim 22 wherein the pivotal connection between the links and their respective outer sections permit swinging relative movement about a vertical axis only.

25. The invention defined in claim 24 wherein the vertical pivotal means is a pair of horizontally spaced apart pivot structures, one adjacent each side of a fore-and-aft extending center line through the central section and coupled with a respective outer section.

26. The invention defined in claim 22 wherein the links and their respective outer sections swingably move with respect to each other about vertical pivotal axes and the central section is towed when the outer sections are in their first position by the links and rigid outer frame portions between the link pivotal connection and pivotal means.

27. A forwardly folding agricultural implement comprising: a central transverse horizontal frame having ground wheels thereon; a pair of outer horizontal frames transversely aligned with the central frame; tools supported on the frames and extending in a fore-and-aft direction therefrom when in their working position; a fore-and-aft extending hitch means including a telescoping member having front and rear sections extendable in length to permit said outer frames to swing forwardly; means connecting the rear section to the central frame; vertical pivot means mounted on the central frame inwardly of its ends; frame members extending transversely of the central frame, the frame members having inner ends carried on the vertical pivot means and outer ends fixed to the respective horizontal outer frames to permit the latter to fold forwardly, said vertical pivot means being spaced inwardly of the respective ends of the central frame distances substantially equal to a major portion of the fore-and-aft dimension of the tools when in their working position and at distances sufficient so that at least major portions of the tools carried on the outer frames are within the transverse expanse of the central frame when the outer frames are folded forwardly; and latch means for securing the outer frames in their forwardly folded position.

28. The invention defined in claim 27 wherein there is further provided between the front and rear sections a roller means including a roller wheel carried by each section, each wheel yieldably biased towards contact with the other section.

29. The invention defined in claim 27 in which the vertical pivot means are centrally located with respect to the central frame on the forward edge thereof, and said frame members extend outwardly from the pivot means beyond the transverse expanse of the central frame.

30. The invention defined in claim 27 characterized by said frame members having fore-and-aft horizontal pivotal junctures adjacent the respective outer ends of the central frame to thereby accommodate relative vertical movements between the central and outer frames.

31. A forwardly folding agricultural implement comprising: a central transverse horizontal frame having ground support wheels; a pair of outer horizontal frames transversely aligned with the central frame; a fore-and-aft extending hitch means composed of telescoping front and rear sections movable between extended and retracted positions and having a forward end adapted for connection to a vertically adjustable tractor hitch; tools supported on the central and outer frames and extending rearwardly therefrom when in working position; means connecting the rear section to the central frame; vertical pivot means mounted and centrally located on the central frame; means mounting the respective outer frames on the vertical pivot means to permit the outer frames to fold forwardly and to position their respective tools forwardly of the central frame and outboard of the vertical pivot means, said vertical pivot means being located inboard of the outer ends of the central frame distances with respect to the outer ends substantially equal to the rearward expanse of the major portions of the tools when in their working position and said distances being sufficient to permit the major portions of said tools on the respective outer frames to be within the transverse expanse of the central frame when the outer frames are folded forwardly; and members rigid with the respective outer frames, engageable with the hitch means when the outer frames are folded forwardly, whereby said outer frames may be supported by the central frame and the hitch means when connected to a tractor hitch and may be raised and lowered by the tractor hitch.

32. The invention defined in claim 31 characterized by said outer frames having horizontally extending pivot means permitting vertical movement relative to the central frame and having ground wheel supports so that the outer frames move in accordance with the ground surface and vertically relative to one another, and by one of said members that are rigid with the respective outer frames having a V-shaped surface opening inwardly when the outer frames are folded forwardly, and the other of said members has a part that engages the V-shaped surface and guides the outer frames to substantially the same height upon the frames being folded forwardly.

33. A forwardly folding agricultural implement comprising: a central transverse wheel supported frame; a pair of outer frames; tools supported on the central and outer frames and extending fore-and-aft thereon when in their working position; vertical pivotal structure carried by the central frame adjacent a fore-and-aft extending center line through the central frame, means connecting the outer frames with the pivotal structure for movement between a first forwardly folded and second transversely extending position, said vertical pivotal structure being located inboard of the transverse opposite ends of the central frame distances with respect to the outer ends substantially equal to the fore-and-aft expanse of the tools when in their working position and at distances sufficient that at least major portions of the tools on the outer frames are within the transverse expanse of the central frame when the outer frames are in their forwardly folded positions; powered folding means between the central frame and each outer frame for moving the latter between its first and second position; locking means between the central and outer frames for releasably securing the latter in their second position; and fore-and-aft extending hitch means including a telescoping member having front and rear sections, the rear section rigidly coupled with the central frame, and a pair of drawbar links extending in diverging relation from forward ends joined together and connected to the front section to rear ends vertically pivotally connected to respective outer frames outwardly of the vertical pivotal structure.

34. The invention defined in claim 33 wherein the outer frames carry complementary latching means for securing them together when in their folded position.

35. The invention defined in claim 34 wherein said latching means includes means for supporting the outer ends of the outer frames on the telescoping member when the frames are in their folded position.

36. The invention defined in claim 34 wherein the latching means includes an arm carried by each outer frame for supporting it on the telescoping member when in its folded position, said arms including complementary shaped positioning means for aligning a power operated latch member carried by one arm with a latching structure carried by the other arm.

37. The invention defined in claim 36 wherein the positioning means includes a horizontally opening V-shaped jaw carried by one arm and a stop bar receivable in said jaw and carried by said other arm.

38. The invention defined in claim 36 wherein the power operated latch member includes a latching pin carried at one end of a hydraulic cylinder pivotally supported on the arm for rotation about a horizontal axis, a control rod pivotally connected at its one end with said arm in vertically spaced relation to the hydraulic cylinder pivotal support, said rod mounted for limited sliding movement along its pivotal connection with said arm, and means rigidly joining the other end of said rod with said hydraulic cylinder.

39. The invention defined in claim 36 wherein the latching means includes an upwardly extending member carried by one arm and having a horizontally opening hook for receivably positioning a latching pin carried by the other arm.

40. The invention defined in claim 33 wherein there is further provided means for releasably locking the telescoping sections in a retracted position.

41. The invention defined in claim 10 wherein there is further provided means for locking the telescoping sections in a retracted position including a plate having an opening therethrough carried by one section and a locking pin carried by the other section and biased towards engagement with said plate and a hydraulic cylinder for disengaging the pin from the opening.

42. The invention defined in claim 33 wherein the drawbar links are pivotally connected to their respective outer frames for swinging movement about vertical axes.

43. The invention defined in claim 33 wherein the pivotal structure is carried by the central frame forwardly thereof and the outer frames include joined inner and outer portions, said inner portions spaced from and forward of said central frame and coupled with said pivotal structure and said outer portions aligned with said central frame.

44. The invention defined in claim 43 wherein said outer frames are further provided with respective horizontal pivot means transversely spaced from the pivotal structure, about which horizontal pivot means said inner and outer portions are permitted relative vertical movement.

45. A forwardly folding agricultural implement comprising: a wheel supported central frame having transversely opposite ends; centrally located vertical pivot means on the central frame; outer frames extending when the implement is in working position transversely outwardly from the opposite ends; tools mounted on the central and outer frames, each outer frame having a frame portion extending inwardly beyond said opposite ends for mounting on the centrally located pivot means to permit the outer frames to swing forwardly to folded positions, and with each of said frame portions having a length sufficient to permit the major portions of the fore-and-aft extending tools on the respective outer frame to be within the transverse expanse of the central frame when the respective outer frame is folded forwardly; drawbar links having forward ends joined together and diverging outwardly and rearwardly when the implement is in working position to rear ends connected to the respective outer frames outwardly of the centrally located pivot means, each drawbar link being composed of a single rigid member; and latch means for detachably locking the respective frame portions to the central frame.

46. A forwardly folding agricultural implement comprising: a wheel supported central frame; a pair of outer frames, one extending outwardly of each end of the central frame; tools supported on the outer frames and extending fore-and-aft with respect thereto when in working position; a drawbar structure composed of folding linkage, one for each side of the implement, each linkage including a forwardly extending link having front and rear ends and pivotally connected at its rear end to an outer end of a transversely extending link that is rigid with its respective outer frame and has its inner end pivotally connected to the central frame at a location inwardly of its respective outer end to permit the outer frame to swing forwardly to a folded position, the latter link being sufficiently long and being pivotally connected to the central frame inboard from the end of the central frame a distance substantially equal to the major portion of the fore-and-aft expanse of the tools on the outer frame when in their working position that when the respective outer frame is in its folded position at least the major portions of the tools carried thereon are within the transverse expanse of the central frame; means connecting the forward ends of the forwardly extending links; and locking means for securing the linkage in a folded position.

47. The invention defined in claim 46 wherein the invention is further characterized by a telescoping member having front and rear sections, the rear section rigid with the central frame and the front section coupled with the forward ends of the forwardly extending links.

48. A forwardly folding agricultural implement comprising: a central transverse horizontal frame vertically adjustable to be raised and lowered on support wheels; a pair of outer horizontal frames transversely aligned with the central frame; a fore-and-aft extending elongated hitch means connected to and for pulling said frames and having a forward end adapted for connection to a vertically adjustable tractor hitch; tools supported on the central and outer frames and extending rearwardly when in working position; vertical pivot means mounted and centrally located on the central frame; means mounting the respective outer frames on the vertical pivot means to permit the outer frames to fold forwardly and to position their respective tools forwardly of the central frame and outboard of the vertical pivot means, said vertical pivot means being located inboard of the outer ends of the central frame distances substantially equal to the rearward expanse of the major portion of said tools when in their working position and sufficient to permit the major portions of said tools on the respective outer frames to be within the transverse expanse of the central frame when the outer frames are folded forwardly; and members rigid with the respective outer frames, engageable with the hitch means when the outer frames are folded forwardly and overlying said hitch means whereby said outer frames when in their folded positions may be suspended on the hitch means and central frame by raising said tractor hitch and the central frame on its support wheels.

* * * * *